UNITED STATES PATENT OFFICE.

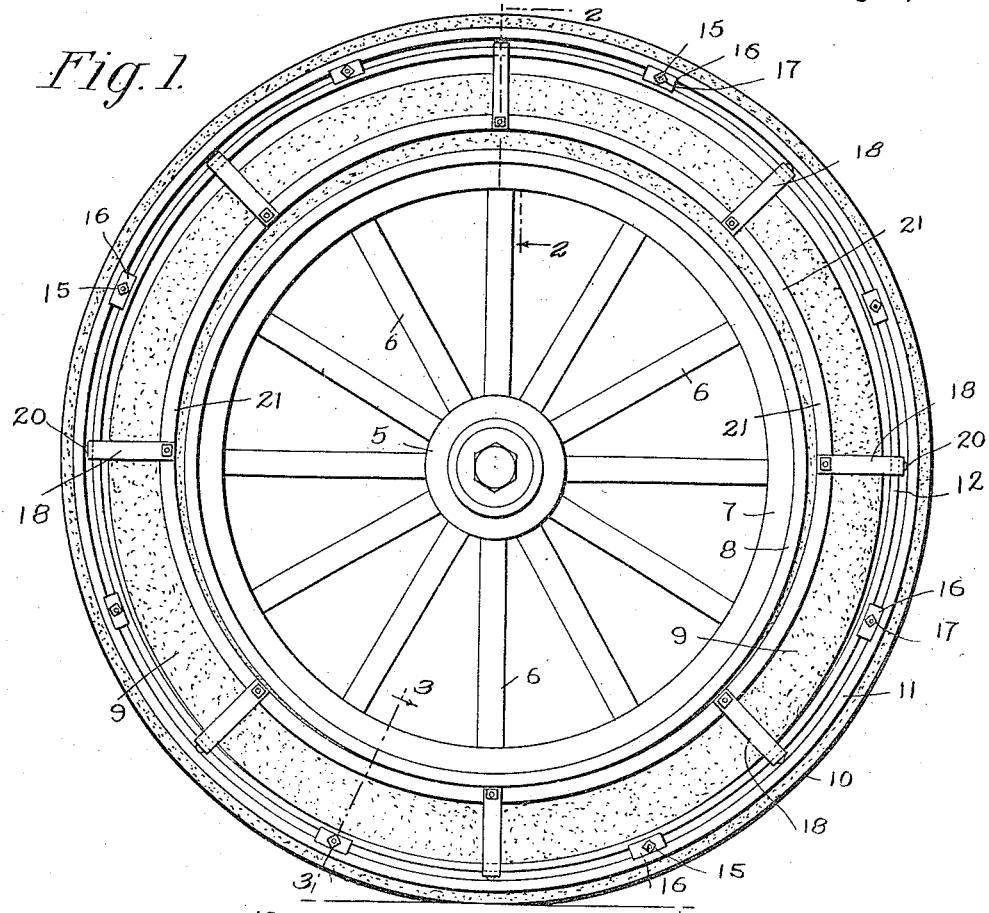

JOHN W. COMER, OF CHICKASHA, OKLAHOMA.

SHOE FOR PNEUMATIC WHEELS.

1,148,957. Specification of Letters Patent. Patented Aug. 3, 1915.

Application filed September 12, 1913. Serial No. 789,457.

*To all whom it may concern:*

Be it known that I, JOHN W. COMER, a citizen of the United States, and a resident of Chickasha, in the county of Grady and State of Oklahoma, have made certain new and useful Improvements in Shoes for Pneumatic Wheels, of which the following is a specification.

My invention is an improvement in the class of protecting shoes for pneumatic tires of automobiles, and similar vehicles, and the invention is embodied in the construction, arrangement, and combination of parts hereinafter described.

Reference is made to the accompanying drawing forming a part of this specification, and in which like letters indicate like parts.

Figure 1 is a side elevation of a wheel equipped with my improved shoe, and with a pneumatic tire associated with the shoe. Fig. 2 is a section on the line 2—2 of Fig. 1, looking in the direction of the arrow. Fig. 3 is a section on the line 3—3 of Fig. 1 looking in the direction of the arrow. Fig. 4 is a detail showing in perspective one of the locking wedges used for forming a part of the shoe.

A wheel hub is shown at 5, spokes at 6 and a felly at 7, this felly carrying a rim 8. Connected with the rim 8 is a tire 9 of resilient material, which in this instance is an ordinary pneumatic tire.

The external tread or peripheral band of the shoe is shown at 10 and is secured to a ring 11. Concentric to this ring and located within the same is another ring 12. Bolts 13 extend between these rings and are severally provided with heads 14 and with threaded portions 15. These bolts extend through locking wedges 16 of the form shown in Fig. 4, two such locking wedges being employed for each bolt, and each having a hole 16ª to accommodate the bolt. Each bolt 13 is fitted with a revoluble nut 17, as indicated in Fig. 3. When the parts are in position, turning the nut 17 forces the two wedges 16, located at opposite ends of the bolt, toward each other so as to force rings 11—12 slightly apart, as may be understood from Fig. 3. A number of substantially L-shaped bars 18 are secured to the ring 12 by bolts 19, as indicated in Fig. 2, and their outer ends are bent substantially parallel with each other so as to extend part way across the ring 12. The bolts 19 are provided with nuts 20 which extend into the annular space between the rings 11 and 12. Two guide rings 21 are connected with the inner ends of the L-shaped bars 18 by bolts 22, the latter being fitted with nuts 23 and thus tightened so as to hold the guide rings 21 in position. The guide rings are spaced sufficiently far apart to clear the adjacent surfaces of the pneumatic tire. In other words, the distance from one of the guide rings 21 to the other is a little greater than the maximum diameter of the pneumatic tire, so that the tire has a little play, in a direction lateral to the plane of rotation of the tire. The parts are so proportioned that the internal diameter of the ring 12 is somewhat greater than the maximum general diameter of the pneumatic tire so that the pneumatic tire as a whole, together with the spokes and hub, has a litle play relatively to the ring 12, as may be understood from Fig. 1. When the bolts 13 are placed in position the inner ring 12 is centered relatively to the ring 11 by adjusting the nuts 17, so as to force the locking wedges 16 into position. In this way the radial thickness of the entire shoe, consisting principally of the rings 11—12 and the tread 10, can be rendered substantially uniform throughout the entire circumference of the wheel.

The operation of my device is as follows:—The parts being assembled and arranged as indicated, the wheel is placed upon a vehicle and in a general way used after the manner of other vehicle wheels resting upon the ground. As the wheel rotates in rolling along upon the ground, the tire 9 rolls upon the inner surface of the ring 12 or in other words, rolls upon the inner bottom surface of the annular shoe, as a whole. Owing to the resiliency of the tire 9 and the fact that the tire has play in two directions relatively to the shoe, the wheel possesses considerable resiliency and is adaptable for many purposes. The tire cannot be punctured as it is protected by the annular shoe, yet the tire has all of the resilience it would have if the shoe were omitted. Again, the tire, by virtual rolling upon the inner surface of the shoe and in consequence of the resilience of the shoe, is controlled in much the same manner as if the shoe were a rail continuously laid down in front of the tire and continuously taken up at the rear thereof.

The guide ring 21 when worn out or damaged may be replaced by another. In fact, the bars 18, the rings 11 and 12, and practically all other parts of the shoe are removable and replaceable.

I do not limit myself to the precise construction shown as variations may be made therein without departing from the spirit of my invention, the scope of which is determined by my claim.

I claim:—

A shoe for pneumatic tires, comprising a pair of concentric rings, means for spacing the rings so as to center the inner ring relatively to the outer ring and for holding the rings together, a tread on the outer ring, a set of bars extending inwardly and parallel from each side of the inner ring, said bars being secured to the outer face of the said inner ring, and a narrow ring secured to the free ends of each set of bars.

JOHN W. COMER.

Witnesses:
F. C. HALL,
H. P. ELLIS.